United States Patent
Barth et al.

(10) Patent No.: US 10,769,319 B2
(45) Date of Patent: Sep. 8, 2020

(54) METHODS AND SYSTEMS FOR FORECASTING TIME-DEPENDENT PHENOMENA BY COMBINING EXPERIMENTAL AND DIGITAL DATA

(71) Applicants: AIRBUS OPERATIONS (S.A.S.), Toulouse (FR); AIRBUS GROUP INDIA PRIVATE LIMITED, Bangalore, Karnataka (IN); AIRBUS OPERATIONS GMBH, Hamburg (DE)

(72) Inventors: Marcus Barth, Toulouse (FR); Lars Hansen, Bremen (DE); Mathieu Berthomet, Antony (FR); Saravanan Rajan, Bangalore (IN)

(73) Assignees: Airbus Operations (S.A.S.), Toulouse (FR); Airbus Group India Private Limited, Bangalore (IN); Airbus Operations GmbH, Hamburg (DE)

( * ) Notice: Subject to any disclaimer, the term of this patent is extended or adjusted under 35 U.S.C. 154(b) by 665 days.

(21) Appl. No.: 15/072,605

(22) Filed: Mar. 17, 2016

(65) Prior Publication Data
US 2016/0275234 A1 Sep. 22, 2016

(30) Foreign Application Priority Data
Mar. 18, 2015 (FR) .................... 15 52241

(51) Int. Cl.
*G06F 17/10* (2006.01)
*G06F 30/15* (2020.01)
(Continued)

(52) U.S. Cl.
CPC .............. *G06F 30/15* (2020.01); *G06F 30/20* (2020.01); *G06F 2111/10* (2020.01)

(58) Field of Classification Search
CPC ........................ G06F 17/5009; G06F 17/5095
(Continued)

(56) References Cited

U.S. PATENT DOCUMENTS

| 2007/0268128 A1* | 11/2007 | Swanson | ............ H04Q 9/00 340/539.22 |
| 2009/0238426 A1* | 9/2009 | Fear | ............ G06K 9/3216 382/128 |

(Continued)

OTHER PUBLICATIONS

Cohen et al. (Sensor Placement Based on Proper Orthogonal Decomposition Modeling of a Cylinder Wake, 12 pages) (Year: 2003).*
(Continued)

*Primary Examiner* — Andre Pierre Louis
(74) *Attorney, Agent, or Firm* — Jenkins, Wilson, Taylor & Hunt, P.A.

(57) ABSTRACT

Prediction methods and systems including a central processing unit including a data acquisition unit configured to acquire experimental data of a parameter characterizing the time-dependent phenomenon, a data acquisition unit configured to acquire digital data of the parameter characterizing the phenomenon, and a data processing unit configured to combine the experimental data and the digital data, by using a proper orthogonal decomposition POD that makes it possible to obtain an effective prediction of the time-dependent phenomenon, combining the advantages of the experimental data (accuracy) and those of the digital data (spatial resolution).

6 Claims, 3 Drawing Sheets

(51) Int. Cl.
  *G06F 30/20* (2020.01)
  *G06F 111/10* (2020.01)
(58) Field of Classification Search
  USPC .............................................................. 703/2
  See application file for complete search history.

(56) References Cited

U.S. PATENT DOCUMENTS

2010/0106471 A1* 4/2010 Velazquez Lopez ........................
                                                     G06F 17/5095
                                                            703/2
2014/0019052 A1* 1/2014 Zaeper ................. G01V 11/002
                                                            702/8
2015/0280648 A1* 10/2015 Vitali ..................... H03M 1/12
                                                          327/355

OTHER PUBLICATIONS

French Search Report for Application No. 155241 dated Feb. 1, 2016.
Bui-Thanh et al: *"Aerodynamic Data Reconstruction and Inverse Design Using Proper Orthogonal Decomposition,"* AIAA Journal, vol. 42, No. 8, Aug. 2004, pp. 51505-1516, XP055245650, Washington, DC; US ISSN: 0001-1452, DOI: 10.2514/1.2159.

* cited by examiner

METHODS AND SYSTEMS FOR FORECASTING TIME-DEPENDENT PHENOMENA BY COMBINING EXPERIMENTAL AND DIGITAL DATA

CROSS-REFERENCE TO RELATED APPLICATION

This application claims priority to French Patent Application FR 15 52241, filed Mar. 18, 2015, the entire disclosure of which is incorporated by reference herein.

TECHNICAL FIELD

The present disclosure relates to a method and a system for predicting at least one time-dependent phenomenon.

BACKGROUND

The prediction of time-dependent phenomena is notably useful in the development and construction of an aircraft. Efforts are thus made to obtain a sufficiently accurate prediction to incorporate time-dependent phenomena in the development of aircraft, notably transport aeroplanes, and thus obtain weight and cost savings.

The present disclosure can be applied to any problem in engineering that requires accurate predictions of time-dependent phenomena, and do so in very many fields (aeronautics, automobiles, metrology, etc.). In aeronautics for example, the present disclosure can be applied to a large number of technical fields (engine, fuselage, landing gear, etc.) of an aircraft and of elements of the aircraft (engine installations, air inlets, landing gear, high lift system devices, etc.).

The time-dependent phenomena can be exhibited in a large number of constituent components or elements of an aircraft, such as the engine installations, the air inlets, landing gears, and/or the high lift system devices. The time-dependent phenomena significantly increase the structural loadings on the components of the aircraft and, thereby, have a direct impact on structural mass (dimensions), the maintenance costs, the lifespan and the availability of the aircraft.

Now, the potential problems linked to such phenomena are often discovered very late in the development of an aircraft (usually during in-flight tests) and have to be resolved through structural reinforcements or shortened inspection intervals, which increases both the weight and the cost of development of the aircraft.

Thus, to be able to avoid these kinds of problems, it is important to be able to have, very early in the design process, an accurate prediction of time-dependent phenomena.

The prediction of time-dependent phenomena is, generally, based on experimental data which give results with a significant accuracy, but with a relatively low spatial resolution (because of a limited number of sensors) so that it does not provide an effective solution for the abovementioned application.

SUMMARY

An object of the present disclosure is to remedy this drawback and to provide a prediction method and system to produce a particularly effective prediction, namely that is both accurate and has high spatial resolution. It relates to a method for predicting at least one time-dependent phenomenon occurring, the method comprising a step comprising or consisting of:

A. acquiring first time-dependent data relating to the phenomenon, the first time-dependent data comprising experimental data of a parameter characterizing the phenomenon, the experimental data being generated by measurements performed using sensors.

According to the disclosure herein, the method further comprises the following steps, comprising or consisting of:

B. acquiring second time-dependent data, relating to the phenomenon, the second time-dependent data comprising digital data of the parameter characterizing the phenomenon, the digital data being obtained by digital simulation; and C. combining the first and second data by using the first data to calibrate the second data, so as to obtain a prediction of the time-dependent phenomenon, the prediction being transmitted to at least one user system.

Thus, by virtue of the disclosure herein, a prediction method is obtained which combines experimental data and digital data, so as to take into account their respective advantages.

Advantageously, step C comprises the following substeps, comprising or consisting of:

C1. transforming the first and second time-dependent data from a time domain into a frequency domain;

C2. constructing models relating to a proper orthogonal decomposition, called POD models, the experimental data and the digital data being decomposed respectively into two POD models, the duly obtained POD models containing different modes relating to a proper orthogonal decomposition, called POD modes;

C3. selecting, from the POD modes, relevant POD modes; and

C4. producing a combination of data, based on the selected relevant POD modes, a corresponding base, called POD base, being computed from the digital data, the experimental data being then used to calibrate the POD base in order to form a complete solution that makes it possible to obtain the prediction of the time-dependent phenomenon.

The prediction method thus uses a mathematical approach, called proper orthogonal decomposition POD. The latter represents an effective and unbiased approach or way for combining time-dependent data originating from different sources. This makes it possible to obtain an advantageous and effective prediction of the time-dependent phenomena, combining the advantages of the experimental data (accuracy) and of the digital data (spatial resolution), and thus makes it possible to remedy the abovementioned drawback.

Furthermore, advantageously, in the substep C1, the experimental data and the digital data are expressed respectively in the form of two sets of data, each of the two sets comprising n samples which contain the values of the parameter at given points for a given frequency, n being an integer representing a number of discrete frequencies considered.

Furthermore, advantageously, the step C comprises a substep C5 comprising or consisting of, in the case of reversible transformation in the substep C1, transforming the complete solution, from the frequency domain into the time domain, so as to obtain the prediction of the time-dependent phenomenon.

In a preferred embodiment, substep C3 comprises or consists of selecting, as relevant POD modes, a number p of first POD modes, p being an integer chosen from 3, 4 and 5.

The present disclosure relates also to a system for predicting at least one time-dependent phenomenon, the system comprising a central processing unit comprising a first data acquisition unit configured to acquire first time-dependent data relating to the phenomenon, the first time-dependent data comprising experimental data of a parameter characterizing the phenomenon, the experimental data being generated by measurements performed by sensors.

According to the disclosure herein, the central processing unit further comprises:
 a second data acquisition unit configured to acquire second time-dependent data relating to the phenomenon, the second time-dependent data comprising digital data of the parameter characterizing the phenomenon, the digital data being obtained by digital simulation; and
 a data processing unit configured to combine the first and second data by using the first data to calibrate the second data, so as to obtain a prediction of the time-dependent phenomenon, the prediction being transmitted to at least one user system.

Advantageously, the data processing unit comprises:
 a data processing element configured to transform the first and second time-dependent data from a time domain into a frequency domain;
 a data processing element configured to construct models relating to a proper orthogonal decomposition, called POD models;
 a selection element configured to select, from the POD modes, relevant POD modes; and
 a data processing element configured to produce a combination of data, based on the selected relevant POD modes, a corresponding base, called POD base, being computed from the set of digital data, the experimental data being then used to calibrate the POD base in order to form a complete solution that makes it possible to obtain the prediction of the time-dependent phenomenon.

Furthermore, advantageously, the data processing unit comprises a data processing element configured to transform, in the case of reversible transformation, the complete solution from the frequency domain into the time domain so as to obtain the prediction of the time-dependent phenomenon.

Moreover, in a particular embodiment, the prediction system further comprises:
 a first data generation unit configured to generate the first data; and/or
 a second data generation unit configured to generate the second data; and/or
 a data transmission unit configured to transmit the prediction of the time-dependent phenomenon to at least one user system.

BRIEF DESCRIPTION OF THE DRAWINGS

The attached figures will give a good understanding of how the disclosure herein can be produced. In these figures, identical references denote similar elements.

DETAILED DESCRIPTION

Figure 1:
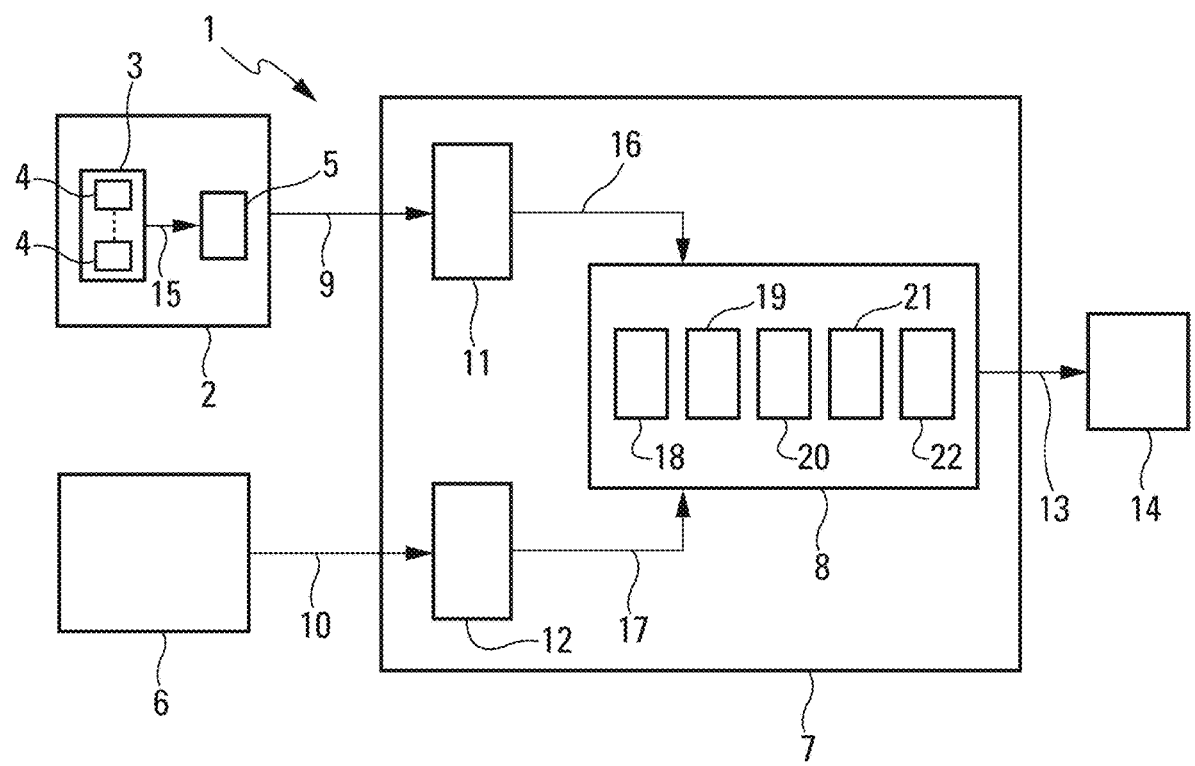
FIG. 1 is the block diagram of a particular embodiment of a system for predicting a time-dependent phenomenon occurring on a part of an aircraft.

The system 1 schematically represented in FIG. 1 and used to illustrate the disclosure herein is a system for predicting at least one time-dependent phenomenon occurring, for example, on a part of an aircraft, in particular of a transport aeroplane.

This part of the aircraft can relate to any element subject to a time-dependent external disturbance, and notably one of the following elements of the aircraft: an engine installation as specified below with reference to FIGS. 3 to 5, an air inlet, a landing gear, a high lift system device, winds, a strut-wind, a horizontal empennage, etc.

Furthermore, the time-dependent phenomena can correspond to any phenomenon, notably a flow of fluid, a structural response, an acoustic or electrical signal, etc., which varies over time.

The system 1 comprises a data generation unit 2 which is configured to generate first time-dependent data, relating to the phenomenon considered. These first (time-dependent) data are experimental data of a parameter characterizing the phenomenon considered. These experimental data are generated by measurements performed on the part of the aircraft. For this, the data generation unit 2 comprises a set 3 of sensors 4 (or measurement elements) which perform measurements and transmit them to a central processing unit 5 (via a link 15). These sensors 4 (or measurement elements) are usual sensors measuring the value of a given parameter. This parameter can correspond to a pressure, temperature, or other such value that makes it possible to characterize the phenomenon considered.

According to the disclosure herein, the system 1 further comprises a (digital simulation) data generation unit 6 which is configured to generate second (time-dependent) data, relating to the same phenomenon. These second time-dependent data are digital data of the parameter characterizing the phenomenon. These digital data are generated by digital simulation. The data generation unit 6 comprises, for this, at least one usual digital simulation unit.

According to the disclosure herein, the system 1 further comprises:
 a central processing unit 7 provided with a data processing unit 8, which is linked via links 9 and 10 respectively to the data generation units 2 and 6 and which receives the experimental data and the digital data generated by these data generation units 2 and 6, via integrated data acquisition units 11 and 12. The data processing unit 8 is configured to produce a prediction of the time-dependent phenomenon, by combining these experimental data and these digital data, as specified below; and at least one data transmission unit (link 13) which provides the results of the prediction produced by the data processing unit 8 to at least one user system 14, for example a display or storage unit or else a computer.

Since the prediction of time-dependent phenomena is notably useful in the development and the construction of an aircraft, this user system 13 can notably correspond to any system (display, storage, etc.) that makes it possible to present the information to an operator involved during the development.

As represented in FIG. 1, the data processing unit 8 which receives the experimental data and the digital data from the acquisition units 11 and 12 respectively via links 16 and 17, comprises:
- a data processing element 18 configured to transform time-dependent experimental data and digital data from the time domain into the frequency domain. The experimental data and the digital data are expressed, respectively, in the form of two sets of data. Each of these two sets comprises n samples which contain the values of the parameter at given points of the part of the aircraft, for a given frequency, n being an integer representing the number of discrete frequencies considered;
- a data processing element 19 configured to construct models relating to a proper orthogonal decomposition POD, called POD models. The experimental data and the digital data are decomposed respectively into two POD models. The duly obtained POD models contain different modes relating to a proper orthogonal decomposition, called POD modes, which are an exact representation of the two initial sets of data;
- a selection element 20 configured to select, from all of the POD modes, relevant POD modes;
- a data processing element 21 configured to produce a combination of data, based on the relevant POD modes, selected by the selection element 20. The data processing element 21 computes a corresponding base, called POD base, from the set of digital data. The data processing element 21 then uses the experimental data to calibrate the POD base in order to form (recreate) a complete solution; and
- a data processing element 22 configured to transform the duly recreated complete solution from the frequency domain into the time domain. This makes it possible to obtain a prediction of the time-dependent phenomenon occurring on the part of the aircraft.

In the context of the present disclosure, the digital data correspond to data generated by usual digital simulations, implemented by the data generation unit 6. Preferably, they are data obtained by simulations relating to digital fluid mechanics of CFD (Computational Fluid Dynamics) type. All usual types of computations and simulations can however be used, for example a lattice Boltzmann method, of LBM type. By way of illustration, it is also possible to use, in the case of an application with loadings and structures, a digital simulation using a Finite Element Method of FEM type, or else a CAA (Computational Aero Acoustics) simulation or digital aero acoustic simulation in the acoustic domain.

Moreover, the experimental data used are data measured by the sensors 4 of the data generation unit 2, and measured notably:
- on an element similar to the one that is to be developed, for example on a similar aircraft, during a flight of this similar aircraft;
- on an isolated element, comprising the part of the aircraft or corresponding thereto, such as an engine for example, during an isolated test on the ground; and/or
- during a flight of the aircraft equipped with the part, after its design and its construction.

The measurements are performed using usual sensors suitable for performing the measurement type or types considered (pressure, temperature, etc.). They can, for example, be microphones which are glued onto the structure of the aircraft on the part and which record the noise.

Used independently, the digital and experimental data do not provide the requisite level of accuracy which is necessary to incorporate time-dependent phenomena into an aircraft design process early on. On the other hand, the system 1 combines the advantages of the experimental data (accuracy) and of the digital data (spatial resolution). It uses, for this, a proper orthogonal decomposition POD which is an effective and unbiased means for combining time-dependent data originating from different sources.

General concepts of the POD decomposition implemented by the data processing unit 7 are detailed hereinbelow.

By considering a field $u(x)$ of a variable x in a limited space X with an averaging operator $<\cdot>$ and by considering that each realization of this field belongs to a Hilbert space H of scalar product $(\bullet|\bullet)$ and of norm $\|\bullet\|$, the following problem:

$$\max_{\phi \in H^*} \frac{\langle(u|\phi)\rangle}{(\phi|\phi)}$$

accepts a set of functions $\phi_i(x)$ as solution. This set of functions constitutes a base $\Phi$ of H, called POD base. u can be decomposed into:

$$u(x) = \sum_{i=1}^{\infty} a_i \phi_i(x)$$

The extension of this decomposition in the case of a space-time signal $u(x,t)$ is simple after the definition of an appropriate averaging operator, and the POD decomposition of u corresponds in this case to:

$$u(x) = \sum_{i=1}^{\infty} a_i(t) \phi_i(x)$$

The POD decomposition of a signal is an optimal decomposition in as much as the difference between u and its projection over the first n functions of the POD base is smaller than if any n other functions are used for the projection.

A reduced number of modes is thus sufficient to recreate the data very accurately. A sample is constructed from an incomplete set of data, using a POD base. This process is called "Gappy POD".

An objective is to combine the high density of information provided by simulations (notably of CFD type) with the high accuracy of experimental data, by using an innovative and efficient method for extracting the information from the simulations.

The spatial variable x is indexed by m. By considering a sample v on which the data are known only over a limited number of points, a "mask" vector n is defined to characterize this property:

$n_m=0$ if the datum is missing; and
$n_m=1$ if the datum is known.

An internal product operator $(\bullet|\bullet)_n$ is then defined by:

$$(u|v)_n=((u,n),(v))$$

in which $(\bullet,\bullet)$ indicates a point-by-point multiplication.

By considering that a POD base $(\phi_k)_{k=1\ldots T}$ has been computed for a set of samples representing the same physical phenomenon as v, and $(a_k)_{k=1\ldots T}$ being a set of coefficients, a reconstructed sample can be formed from p first modes, as follows:

$$\tilde{v} = \sum_{k=1}^{p} a_k \phi_k$$

An object of the procedure is to determine the set of coefficients $(a_k)_{k=1\ldots T}$ which minimizes the quantity:

$$E=(\tilde{v}-v|\tilde{v}-v)_n$$

namely the error in the reconstructed sample based on the initial data available.

This procedure is used as a data-bridging method. For this, a POD base is computed for a set of digital solutions (CFD simulations) and an incomplete sample generated by experimental data is used to recreate a complete solution from this base, taking into account the fact that digital data and the experimental data relate to the same aerodynamic phenomenon. Since the application relates to non-stationary phenomena and random signals, the data are not analysed and used in the time domain but in the frequency domain. Consequently, the "Gappy POD" reconstruction is produced in the frequency domain. This is implemented in the above-mentioned manner, by using frequency steps instead of time steps. The samples are no longer in the form u(x,t) but in the form Γ(x,f). The optimization coefficient is applied to one frequency step at a time, to obtain a calibrated solution.

Figure 2:
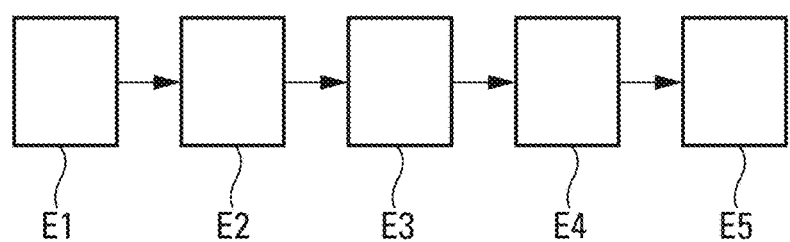
FIG. 2 illustrates a series of steps implemented by a data processing unit of the prediction system, in the context of a proper orthogonal decomposition.

The system 1, and notably the data processing unit 8, as described above, implement, from experimental data and digital data (determined previously as specified below and received from the units 2 and 6), a succession of steps E1 to E5, as illustrated in FIG. 2, comprising or consisting of:

E1. transforming the time-dependent experimental data and digital data from the time domain into the frequency domain;

E2. constructing models relating to a proper orthogonal decomposition, called POD models, containing different POD modes;

E3. selecting relevant POD modes;

E4. producing a combination of data, based on the selected relevant POD modes, by computing a corresponding base, called POD base, from the set of digital data and by calibrating this POD base from the set of experimental data in order to recreate a complete solution of the base; and E5. transforming the duly recreated complete solution from the frequency domain into the time domain so as to obtain the prediction sought, that is to say the prediction of the time-dependent phenomenon occurring on the part concerned of the aircraft.

Figure 3:
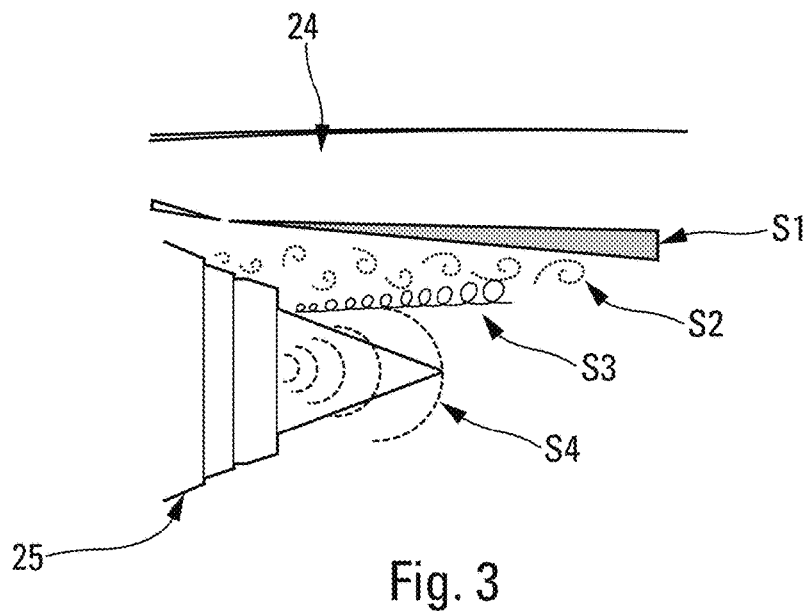
FIG. 3 schematically shows a set of fatigue-generating excitation sources on a fairing behind an engine strut of an aircraft, on which the disclosure herein is illustrated.
Figure 4:
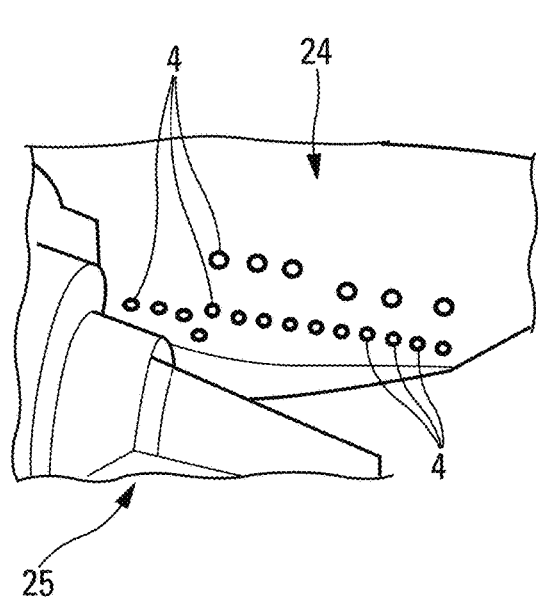
FIG. 4 shows the positioning of sensors on a fairing behind an engine strut of an aircraft (relative to the example of FIG. 3) illustrating a spatial resolution of experimental data.
Figure 5:
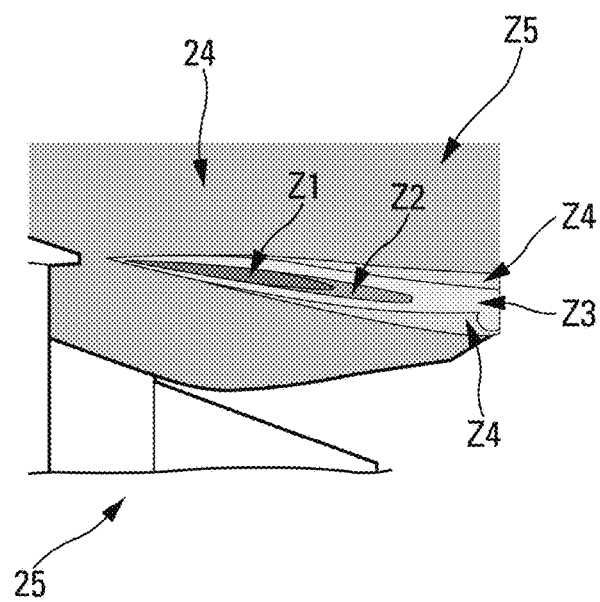
FIG. 5 illustrates a spatial resolution of digital data at the level of a fairing behind an engine strut of an aircraft (relative to the example of FIG. 3).

Operation of the system 1 is described in more detail below, applied to the example of the prediction of the acoustic fatigue on an APF 24 fairing (Aft-Pylon Fairing) behind the strut of an engine 25 of the aircraft, as schematically represented in FIGS. 3 to 5. The acoustic fatigue can be caused by a number of excitation sources, the effects of which are represented in FIG. 3 by different symbols S1 to S4. These excitation sources comprise a mixing layer S1 between the secondary jet and the external flow (and the resultant noise), a turbulence from the engine S2, interactions S3 with the lower spar, and noises S4 of the engine 25. These phenomena generate a non-stationary pressure field which acts on the APF structure and can cause structural damage. In particular, an under-dimensioned structure can lead to premature structural fatigue (acoustic fatigue, increased maintenance costs), whereas an overdimensioned structure can lead to excessive weight (degraded aircraft performance). To obtain an APF structure of optimal design, it is necessary to have an accurate prediction of the non-stationary pressure field in the first phases of development of the aircraft. Because of the random and local nature of the non-stationary pressure field, the prediction needs to have both a high accuracy and a high spatial resolution. The system 1 makes it possible to produce such a prediction (based on experimental data and digital data).

By way of illustration, a spatial resolution is shown, concerning this example, for experimental data in FIG. 4 and for digital data in FIG. 5.

The spatial resolution of the experimental data is limited to a few discrete sensors 4. With only such experimental data, there is a risk of not detecting the global maximum of the non-stationary pressure field. On the other hand, the spatial resolution of the digital data is higher (with, for example, a number of data greater than 100 000 points), generating a uniform distribution, of which different zones Z1 to Z5 exhibiting different pressure fields are represented in FIG. 5. In this case, the maximum is correctly defined.

In this particular example, the system 1, notably via the data processing unit 8, implements the following steps E1 to E5:

E1. Transformation into the frequency domain. Because of the random nature of the non-stationary pressure field, the time-dependent data are transformed into the frequency domain (PSD or Fourier transform). The power spectral density PSD of the pressure is preferably considered. The experimental data and the digital data are expressed in the form of two sets of data, each set comprising n samples (or snapshots) which contain the pressure data on the sensors for a given frequency (n is the number of discrete frequencies);

E2. Construction of the POD models. The experimental data and the digital data are decomposed into two POD models. The duly obtained POD models contain the different POD modes, which are an exact representation of the initial data sets;

E3. Selection of the relevant POD modes. The first POD modes usually contain most of the energy of the time-dependent signal. The first four modes often contain more than 99% of the total energy. It is thus superfluous to take into account all the POD modes during the combination, which could reduce the robustness of the method. The number of POD modes is reduced to the relevant modes to capture the physics of the time-dependent phenomena (usually between 3 and 5);

E4. Combination of the data based on the reduced POD models. A POD base is computed from the set of high-resolution data (digital data). The data with high fidelity, but with low resolution (experimental data) are then used to calibrate the POD base ("Gappy POD") and to recreate a new complete solution. This new solution now contains the high resolution of the digital data and the high accuracy of the experimental data; and E5. Transformation into the time domain. If the initial datum has been transformed into the frequency domain using a reversible transformation such as a Fourier transform, the combined data can be retransformed into the time domain in reverse.

Figure 6:
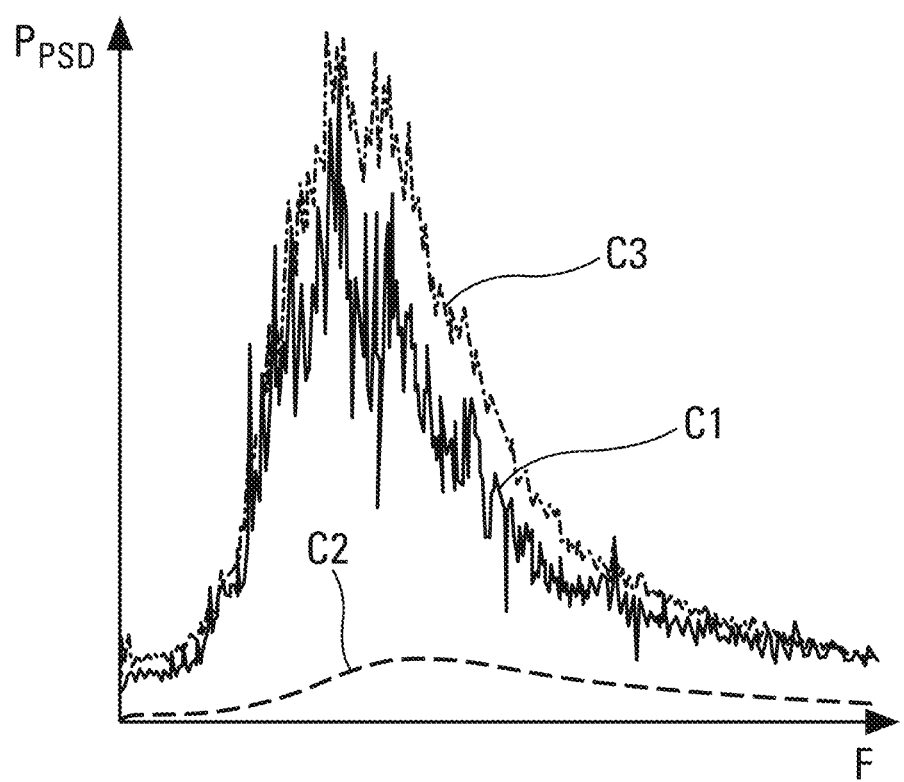
FIG. 6 is a graph representation showing three curves illustrating a pressure PSD, respectively for experimental data, digital data, and combined data generated by the combination of the experimental data and of the digital data.

The results obtained can be clearly understood from FIG. 6. FIG. 6 shows the trend of a pressure $P_{PSD}$ as a function of the frequency F, for a given sensor position, respectively:
in the form of a curve C1 illustrating the experimental data;
in the form of a curve C2 illustrating the digital data; and
in the form of a curve C3 illustrating the combined data (obtained using the system 1).

It will be noted that the accuracy of the combined solution conforms well with the experimental data.

The system 1 and the method, as described above, producing a combination of data (data-bridging process) which combines experimental data and digital data for the time-dependent signals, notably make it possible to obtain a prediction accuracy necessary for incorporating time-dependent phenomena in the development of aircraft, notably transport aeroplanes, and thus obtain weight and cost savings.

The system 1 and the method therefore make it possible:
to improve the effectiveness of the prediction;
to obtain a weight and cost saving;
to introduce time-dependent phenomena in the development of an aircraft; and
to reduce the complexity and the costs of experimental methods (reduced test instrumentation and matrix).

Furthermore, this system 1 and this method are applicable to many engineering domains (aeronautics, transport, computing, building, etc.) for a large number of technical disciplines (fluid mechanics, acoustics, loadings, structure, electronics).

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A computer implemented method for predicting at least one time-dependent phenomenon, the method comprising:
A. acquiring, by a first data acquisition unit in communication with a first data generation unit comprising one or more sensors, first time-dependent data relating to the phenomenon, the first time-dependent data comprising experimental data of a parameter characterizing the phenomenon, the experimental data being generated by measurements performed using the one or more sensors;
B. acquiring, by a second data acquisition unit in communication with a second data generation unit comprising one or more processors, second time-dependent data, relating to the phenomenon, the second time-dependent data comprising digital data of the parameter characterizing the phenomenon, the digital data being obtained by digital simulation; and
C. generating, by a data processing unit in communication with the first data acquisition unit and the second data acquisition unit, a prediction of the time-dependent phenomenon by using the first time-dependent data to calibrate the second time-dependent data, wherein the prediction is a higher resolution prediction of the time-dependent phenomenon than at least the first time-dependent data, and the prediction is based on the second data that was calibrated, wherein step C comprises:
C1. transforming the first and second time-dependent data from a time domain into a frequency domain;
C2. constructing proper orthogonal decomposition (POD) models relating to a POD, the experimental data and the digital data being decomposed respectively into two POD models, the POD models that were constructed containing different POD modes relating to a POD;
C3. selecting, from the POD modes, relevant POD modes;
C4. producing calibrated data, based on the selected relevant POD modes, a corresponding base, called POD base, being computed from the digital data, the experimental data being then used to calibrate the POD base to form a complete solution to obtain the prediction of the time-dependent phenomenon; and
C5. in case of reversible transformation in sub-step C1, transforming the complete solution, from a frequency domain into a time domain, to obtain the prediction of the time-dependent phenomenon;
wherein the first data generation unit and the second data generation unit are separate data generation units;
wherein the first data acquisition unit and the second data acquisition unit are separate data acquisition units;
wherein the first data acquisition unit connects to the data processing unit via a first data transmission link and the second data acquisition unit connects to the data processing unit via a second data transmission link that is separate from the first data transmission link; and
wherein sub-step C3 comprises selecting, as relevant POD modes, a number p of first POD modes, p being an integer selected from the group consisting of 3, 4 and 5.

2. The method according to claim 1, wherein, in step C1, the experimental data and the digital data are expressed respectively in a form of two sets of data, each of the two sets comprising n samples which contain values of the parameter characterizing the phenomenon at given points for a given frequency, n being an integer representing a number of discrete frequencies considered.

3. A system for predicting at least one time-dependent phenomenon, the system comprising:
a central processing unit;
a first data acquisition unit in communication with a first data generation unit comprising one or more sensors, wherein the first data acquisition unit is executable by the central processing unit to acquire, from the data generation unit, first time-dependent data relating to the phenomenon, the first time-dependent data comprising experimental data of a parameter characterizing the phenomenon, the experimental data being generated by measurements performed by the one or more sensors;
a second data acquisition unit in communication with a second data generation unit comprising one or more processor, wherein the second data acquisition unit is executable by central processing unit to acquire second time-dependent data relating to the phenomenon, the second time-dependent data comprising digital data of the parameter characterizing the phenomenon, the digital data being obtained by digital simulation; and
a data processing unit, wherein the data processing unit is in communication with the first data acquisition unit and the second data acquisition unit and configured to use the first time-dependent data to calibrate the second time-dependent data, thereby generating a prediction of the time-dependent phenomenon based on the second time-dependent data that was calibrated, wherein the prediction is a higher resolution prediction of the time-dependent phenomenon than at least the first time-dependent data, wherein the data processing unit comprises:
a first data processing element to transform the first and second time-dependent data from a time domain into a frequency domain;
a second data processing element to construct POD models relating to a proper orthogonal decomposition;
a selection element to select, from the POD modes, relevant POD modes;
a third data processing element to produce calibrated data, based on the selected relevant POD modes, a corresponding POD base, being computed from the digital data, the experimental data being then used to calibrate the POD base to form a complete solution to obtain the prediction of the time-dependent phenomenon; and
a fourth data processing element to transform, in case of reversible transformation, the complete solution from the frequency domain into the time domain to obtain the prediction of the time-dependent phenomenon;
wherein the first data generation unit and the second data generation unit are separate data generation units;
wherein the first data acquisition unit and the second data acquisition unit are separate data acquisition units;
wherein the first data acquisition unit connects to the data processing unit via a first data transmission link and the second data acquisition unit connects to the data processing unit via a second data transmission link that is separate from the first data transmission link; and
wherein relevant POD modes refers to, a number p of first POD modes, p being an integer selected from 3, 4 and 5.

4. The system according to claim 3, further comprising a data transmission unit comprising one or more processors configured to transmit the prediction to at least one user system.

5. One or more non-transitory computer readable media comprising instructions that, when executed by one or more computers, cause the one or more computers to perform a method of predicting at least one time-dependent phenomenon, the instructions comprising:
A. acquiring from a first data acquisition unit in communication with the one or more computers first time-dependent data relating to the phenomenon, the first time-dependent data comprising experimental data of a parameter characterizing the phenomenon, the experimental data being generated by measurements performed by a first data generation unit in communication with the first data acquisition unit and comprising one or more sensors and one or more processors, wherein the measurements are performed using the one or more sensors;
B. acquiring from a second data acquisition unit in communication with the one or more computers second time-dependent data, relating to the phenomenon, the second time-dependent data comprising digital data of the parameter characterizing the phenomenon, the digital data being obtained by digital simulation performed by a second data generation unit in communication with the second data acquisition unit and comprising one or more processors; and
C. generating, by the one or more computers, a prediction of the time-dependent phenomenon by using the first time-dependent data to calibrate the second time-dependent data wherein the prediction is a higher resolution prediction of the time-dependent phenomenon than at least the first time-dependent data, and the prediction is based on the second data that was calibrated;
C1. transforming the first and second time-dependent data from a time domain into a frequency domain;
C2. constructing proper orthogonal decomposition (POD) models relating to a POD, the experimental data and the digital data being decomposed respectively into two POD models, the POD models that were constructed containing different POD modes relating to a POD;
C3. selecting, from the POD modes, relevant POD modes;
C4. producing calibrated data, based on the selected relevant POD modes, a corresponding base, called POD base, being computed from the digital data, the experimental data being then used to calibrate the POD base to form a complete solution to obtain the prediction of the time-dependent phenomenon; and
C5. in case of reversible transformation in sub-step C1, transforming the complete solution, from a frequency domain into a time domain, to obtain the prediction of the time-dependent phenomenon;
wherein the first data generation unit and the second data generation unit are separate data generation units;
wherein the first data acquisition unit and the second data acquisition unit are separate data acquisition units; and
wherein the first data acquisition unit connects to the data processing unit via a first data transmission link and the second data acquisition unit connects to the data processing unit via a second data transmission link that is separate from the first data transmission link; and wherein sub-step C3 comprises selecting, as relevant POD modes, a number p of first POD modes, p being an integer selected from the group consisting of 3, 4 and 5.

6. A method of constructing a vehicle based on the prediction generated in claim 1, the method comprising:

transmitting the prediction to at least one user system for user inspection; and constructing or developing the vehicle based on the prediction transmitted to the at least one user system in order to minimize structural loadings on components of the vehicle.

\* \* \* \* \*